United States Patent Office 3,476,769
Patented Nov. 4, 1969

3,476,769
PREPARATION OF CYCLOPENTADIENYL NICKEL CATALYSTS
Perry L. Maxfield, Durango, Colo., assignor to Phillips Petroleum Company, a corporation of Delaware
No Drawing. Filed Nov. 21, 1966, Ser. No. 595,591
Int. Cl. C07d 63/00; B01j 11/78
U.S. Cl. 260—332.5     6 Claims

ABSTRACT OF THE DISCLOSURE

Catalytically active nickel complexes are prepared by reacting dicyclopentadienyl nickel compounds with a ligand compound selected from organo phosphorus, organo arsenic, or organo antimony compounds and a halogenating agent such as the lower aliphatic bromides and chlorides.

This invention relates to nickel compounds. In one aspect it relates to a process for preparing cyclopentadienyl nickel halide compounds. In another aspect it relates to a process for reacting a cyclopentadienyl nickel compound, an organo compound of phosphorus, arsenic, antimony, or sulfur, and an organohalo compound.

It is known that compounds having the general formula

CpNi(L)X wherein Cp is a cyclopentadienyl radical, (L) is an organic ligand, and X is a halogen are, in the presence of suitable grignard reagents, aluminum halides, alkyl aluminum alkyls, desirable polymerization, isomerization, and olefin oligomerization catalysts. However, the known methods for the preparation of these nickel catalysts suffer the disadvantages of requiring rather involved procedures and rather expensive and/or extremely toxic starting materials.

It is known that compounds can be prepared by reacting cyclopentadienyl nickel carbonyl iodide and an organophosphine according to the equation (Cp)Ni(CO)I + PR$_3$ → CpNi(PR$_3$)I + CO↑

The cyclopentadienyl nickel carbonyl iodide starting material is not readily available, is extremely toxic, and the yields of this process are relatively low. Yet another method for the preparation of these compounds involves a metathetical reaction between dicyclopentadienyl nickel and bis(triarylphosphine)nickel halide, this latter compound requiring preparation in a preliminary reaction of triarylphosphine and nickel chloride. This approach is inconvenient in that two different nickel compounds are required and the process requires two steps.

It is therefore one object of this invention to provide an improved method for the production of a cyclopentadienyl nickel compound. It is another object of this invention to provide a method for the preparation of complex cyclopentadienyl nickel compounds from relatively inexpensive chemically stable starting materials. It is another object of this invention to provide a simplified method for the production of cyclopentadienyl nickel complex type catalysts in high yields from readily available starting materials.

Other aspects, objects and advantages of the concept of this invention will be apparent in view of the following disclosure and the appended claims.

In accordance with one embodiment of this invention complex cyclopentadienyl nickel halides compounds are prepared by contacting compounds having the formulas:

(1)
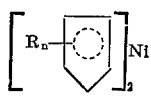

(2) R$_3$M, R–S–R, or SR″, and (3) R′X$_y$ wherein $n$ is an integer from 0 to 3; each R is an alkyl, cycloalkyl, or aryl radical or a combination of these such as alkaryl or aralkyl having up to about 10 carbon atoms; M is one of phosphorus, arsenic, or antimony; X is one of chlorine, bromine, or iodine; $y$ is an integer from 1 to 5; R′ is a hydrocarbyl radical having up to 10 carbon atoms which can be monovalent or polyvalent depending upon $y$; and R″ is a saturated or olefinically unsaturated aliphatic radical having 3 to 7 carbon atoms.

Some specific examples of compound 1 which are applicable for use in this invention are:

dicyclopentadienylnickel (nickelocene)
bis(methylcyclopentadienyl)nickel
bis(cyclohexylcyclopentadienyl)nickel
bis(isopropylcyclopentadienyl)nickel
bis[(3,4,5-trimethylbenzyl)cyclopentadienyl]nickel
bis(1-methylpropylcyclopentadienyl)nickel
bis(1-naphthlcyclopentadienyl)nickel
bis(decylcyclopentadienyl)nickel
bis(p-tolylcyclopentadienyl)nickel
bis(2,2-dimethylpropylcyclopentadienyl) nickel, and mixtures thereof. Of these, nickelocene is preferred because of its ready availability.

Some specific examples of compound 2 are:

triphenylphosphine
tributylphosphine
tricyclopentylarsine
trihexylstibine
trimethylphosphine
tri(4-phenylbutyl)phosphine
triphenylarsine
tripropylstibine
phenyl sulfide
ethyl sulfide
ethyl phenyl sulfiide
thiophene
2-methylthiophene
3,4-dimethyl thiophene, and mixtures thereof. Of these, the phosphine are presently preferred.

Some specific examples of compound 3 are:

ethylene dibromide
butyl iodide
allyl bromide
benzyl chloride
1,3,5-trichlorocyclohexane
1,2-dibromopropane
p-bromochlorobenzene
1,5-dichloro-3-ethylpentane
4-bromobutene-1
ethylene dichloride
1,2-dichloropropane, and mixtures thereof. Presently preferred are the lower aliphatic bromides and chlorides.

The nickel compounds which are produced by the process of the present invention have the formula CpNi(L)X wherein Cp represents a π-bonded cyclopentadienyl or an R-substituted cyclopentadienyl radical, (L) is a ligand selected from R$_3$M, R-S-R, and SR″, and wherein R, M, R″, and X are as defined above.

Some specific examples of such nickel compounds which can be formed according to the present invention are:

cyclopentadienyl(triphenylphosphine)bromonickel
methylcyclopentadienyl(tributylarsine)chloronickel cyclopentadienyl(trimethylstibine)iodonickel
isopropylcyclopentadienyl(thiophene)bromonickel
1,2,4-triethylcyclopentadienyl(trihexylphosphine)chloronickel
cyclohexylcyclopentadienyl(tribenzylphosphine)chloronickel
cyclopentadienyl(2-methylthiophene)chloronickel
decylcyclopentadienyl(triphenylphosphine)iodonickel
cyclopentadienyl(triethylarsine)bromonickel
p-tolylcyclopentadienyl(tribenzylstibine)chloronickel
cyclopentadienyl(tricyclopentylphosphine)bromonickel
cyclopentadienyl(thiophene)chloronickel
and the like.

In general, equimolar proportions of compounds 1, 2 and 3 are used. The process can be carried out, however, with an excess or deficiency of one of the reactants but at the expense of efficiency and possible subsequent purification problems. If desired, however, compound 3, the halide component, can be present in such an excess that it will also serve as a convenient medium for the reaction. The reaction can also be carried out in other suitable solvents such as benzene, toluene, aliphatic hydrocarbons in the gasoline range, or any inert solvent in which the reactants are at least partially soluble. A wide range of reaction temperatures can be employed although it is desirable to maintain the temperature at a point below or in the range of the boiling point of the solvent at operating pressures. In the presently preferred embodiment of this invention the temperatures within a range of from about 0 to about 130° C., preferably 30-75° C., can be employed. The time of reaction can vary broadly from about 0.1 to 30 hours, but reaction times of from 1-5 hours are preferred in order to obtain a relatively high degree of conversion; i.e., 80 to 90 percent yields based on nickel compound reactant, longer holding times being required at lower temperatures.

Following completion of reaction, the crude product can be recovered by any conventional technique, for example, after filtration to remove any solids present, the product can be crystallized by evaporation of the solvent at reduced pressures. The product can be further purified by re-crystallization. However, in many instances in which the nickel product compound is used as a catalyst or catalyst system component, no purification or treatment of the reaction mixture is necessary.

The following examples are intended to be illustrative of the concept of this invention.

Example I

A 0.04 g. mole quantity each of nickelocene, triphenylphosphine, and allyl bromide were dissolved in 60 ml. benzene and introduced into a stirred flask. The mixture was heated at 50° C. for 1½ hours, filtered and the benzene was removed by vacuum distillation. The crude product was recrystallized from benzene to give deep red hexagonal crystals of cyclopentadienyl(triphenylphosphine)bromonickel in an 80-90 percent yield based on the nickelocene. The product was analyzed with the following results: mole percent Ni—11.5; C—60.5; H—4.6; Br—23.4. IR Spectral analysis of the product showed the presence of mono-substituted phenyl (~7μ) and cyclopentadienyl radicals (~13.4μ).

Example II

In another series of tests, identical runs were made using 0.04 g. moles of tributylphosphine, triphenylarsine, and thiophene rather than the triphenylphosphine of Example I to prepare the corresponding cyclopentadienyl nickel derivatives of each. Accordingly, about 80-90 percent yields, based on nickelocene, of cyclopentadienyl(tributylphosphine)bromonickel, cyclopentadienyl(triphenylarsine)bromonickel, and cyclopentadienyl(triophene)bromonickel were respectively obtained.

I claim:
1. A method for the production of complex cyclopentadienyl nickel halide compounds of the formula CpNi(L)X wherein Cp represents a cyclopentadienyl radical, (L) is a ligand, and X is a halide which comprises reacting
(a) a cyclopentadienyl nickel compound of the formula

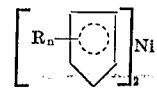

wherein R is a radical selected from the group consisting of alkyl, cycloalkyl, aryl and combinations thereof having up to 10 carbon atoms, and $n$ is an integer from 0 to 3, and
(b) a ligand (L) forming compound selected from the group consisting of $R_3M$, R-S-R, and thiophene and alkyl substituted thiophenes wherein R is as defined above in (a) and M is selected from the group consisting of phosphorus, arsenic, and antimony, with
(c) a halide of the formula $R'X_y$ wherein R' is a hydrocarbyl radical having up to 10 carbon atoms which can be monovalent or polyvalent depending upon $y$, $y$ is an integer from 1 to 5, and X is selected from the group consisting of chlorine, bromine, and iodine.

2. The method of claim 1 wherein said reaction is conducted in the presence of at least one solvent selected from the group consisting of said $R'X_y$ compound, and gasoline range hydrocarbons at a temperature below the boiling point of said solvent.

3. The method of claim 1 wherein said nickel compound, said ligand forming compound and said halide are present in substantially equimolar amounts at a temperature of from about 0 to about 130° C.

4. The method of claim 1 wherein said nickel compound is nickelocene, said ligand forming material is selected from the group consisting of triphenylphosphine, triphenylarsine, and thiophene, said halide is allyl bromide and wherein said compounds are reacted in the presence of a benzene diluent.

5. The method of claim 1 wherein the (a) is dicyclopentadienyl nickel, (b) M in the ligand forming compound is phosphorus, (c) is a lower aliphatic bromide, and the reacting is conducted in a hydrocarbon diluent.

6. The method of claim 1 wherein (a) is dicyclopentadienyl nickel, (b) is tributylphosphine, (c) is allyl bromide, and the diluent is benzene.

References Cited

UNITED STATES PATENTS
3,054,815   9/1962   Schroll _____ 260—439

OTHER REFERENCES
Yamazaki, et al., J. Arganometal Chem., vol. 6, No. 1, pp. 86–91 (1966).

HENRY R. JILES, Primary Examiner
C. M. SHURKO, Assistant Examiner

U.S. Cl. X.R.
252—437, 439, 441; 260—439, 684, 695